United States Patent
Pham et al.

(10) Patent No.: US 10,250,311 B2
(45) Date of Patent: Apr. 2, 2019

(54) METHOD AND SYSTEM FOR MIMO COMMUNICATION (71) Applicant: NEC Corporation, Minato-ku, Tokyo (JP)

(72) Inventors: Duong Pham, Victoria (AU); Yasushi Maruta, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 15/529,194

(22) PCT Filed: May 1, 2015

(86) PCT No.: PCT/JP2015/063839
§ 371 (c)(1),
(2) Date: May 24, 2017

(87) PCT Pub. No.: WO2016/098369
PCT Pub. Date: Jun. 23, 2016

(65) Prior Publication Data
US 2017/0331539 A1 Nov. 16, 2017

(30) Foreign Application Priority Data
Dec. 15, 2014 (AU) .................. 2014905071

(51) Int. Cl.
H04B 7/0456 (2017.01)
H04B 7/0417 (2017.01)
H04B 7/0426 (2017.01)
H04B 7/06 (2006.01)
(Continued)

(52) U.S. Cl.
CPC ......... H04B 7/0486 (2013.01); H04B 7/0417 (2013.01); H04B 7/0426 (2013.01);
(Continued)

(58) Field of Classification Search
CPC .. H04B 7/0486; H04B 7/0639; H04B 7/0417; H04B 7/0632; H04B 7/0626; H04B 7/0426; H04L 5/14; H04L 25/0248
(Continued)

(56) References Cited

U.S. PATENT DOCUMENTS

2004/0171359 A1 9/2004 Tirkkonen et al.
2004/0252632 A1 12/2004 Bourdoux et al.
(Continued)

FOREIGN PATENT DOCUMENTS

WO 2013/179806 A1 12/2013

OTHER PUBLICATIONS

Shinya Kumagai et al., "Total Transmit Power Minimization under Per-Antenna Power Constraint for MIMO-SVD", IEICE Technical Report, Jun. 2014, vol. 114, No. 86, pp. 125-130, RCS2014-54.
(Continued)

Primary Examiner — Chieh M Fan
Assistant Examiner — Fitwi Y Hailegiorgis (57) ABSTRACT A MIMO system (100) and a method of generating a precoder for use in a MIMO system (100), when communicating with a UE (115), are provided. The method comprises receiving, from the UE (115), channel information relating to a channel on which data is transmitted; decomposing the channel information into components representing a transmission component and a signal strength component; and generating the precoder according to the transmission component and the signal strength component.

13 Claims, 4 Drawing Sheets (51) Int. Cl.
*H04L 25/02* (2006.01)
*H04L 5/14* (2006.01)

(52) U.S. Cl.
CPC ......... *H04B 7/0626* (2013.01); *H04B 7/0632* (2013.01); *H04B 7/0639* (2013.01); *H04L 5/14* (2013.01); *H04L 25/0248* (2013.01)

(58) Field of Classification Search
USPC ............ 375/260, 267; 370/328, 329; 455/65
See application file for complete search history.

(56) References Cited

U.S. PATENT DOCUMENTS

2006/0193294 A1    8/2006   Jorswieck et al.
2008/0219369 A1*   9/2008   Wu ....................... H04L 1/0002
                                                                                             375/260
2009/0143017 A1*   6/2009   Barak .................. H04B 7/0413
                                                                                              455/65
2011/0280188 A1*   11/2011   Jeon ..................... H04B 7/0413
                                                                                              370/328
2014/0254532 A1*   9/2014   Ryu ....................... H04B 7/024
                                                                                              370/329

OTHER PUBLICATIONS

International Search Report for PCT Application No. PCT/JP2015/063839, dated Jul. 14, 2015.
Written opinion of the International Searching Authority PCT Application No. PCT/JP2015/063839, dated Jul. 14, 2015.

* cited by examiner

METHOD AND SYSTEM FOR MIMO COMMUNICATION

This application is a National Stage Entry of PCT/JP2015/063839 filed on May 1, 2015, which claims priority from Australian Patent Application 2014-905071 filed on Dec. 15, 2014, the contents of all of which are incorporated herein by reference, in their entirety.

TECHNICAL FIELD

The present invention relates to control signalling in advanced wireless communication networks. In particular, the invention relates to generation of precoders in MIMO (Multiple-Input Multiple-Output) systems.

ABBREVIATIONS

The following abbreviations are used herein:
CSI Channel State Information which includes PMI, RI, CQI
DL Down Link
FDD Frequency-division duplexing
MMSE Minimum Mean Squared Error
PMI Precoder Matrix Indicator
TDD Time-division duplexing
UE User Equipment
UL Up Link
|a| denotes absolute value
$\|a\|^2 = |a(1)|^2 + \ldots + |a(N)|^2$
Ea denotes expectation of a

BACKGROUND ART

Wireless communication systems are widely known in which base stations (also known as eNodeBs (evolved Node Bs (eNBs))) communicate with mobile devices (also known as user equipments (UEs)) which are within range of the eNB. Each eNB divides its available bandwidth, i.e. frequency and time resources, into different resource allocations for the different UEs. There is a constant need to increase the capacity of such systems, and to improve the efficiency of resource utilisation, in order to accommodate more users (more UEs), more data-intensive services and/or higher data transmission rates.

Feedback about the status of a downlink channel between the eNB and the UE may be employed in order to optimise transmission of data over the downlink channel. In particular, the UE may determine downlink channel status information (CSI) from received pilot signals, and then communicate the CSI to the eNB. The eNodeB may use this data to determine a precoding for subsequent data transmissions to the UE.

A problem with MIMO systems of the prior art is that there performance is in certain circumstances.

There is therefore a need to improve MIMO precoding performance.

It will be clearly understood that, if a prior art publication is referred to herein, this reference does not constitute an admission that the publication forms part of the common general knowledge in the art in Australia or in any other country.

SUMMARY OF INVENTION

The present invention is directed to generating a precoder, which may at least partially overcome at least one of the abovementioned disadvantages or provide the consumer with a useful or commercial choice.

With the foregoing in view, the present invention in one form, resides broadly in a method of generating a precoder for use in a MIMO system when communicating with a UE, the method comprising:
receiving, from the UE, channel information relating to a channel on which data is transmitted;
decomposing the channel information into components representing a transmission component and a signal strength component; and
generating the precoder according to the transmission component and the signal strength component.

The channel information may be decomposed using singular value decomposition (SVD).

The transmission component may comprise a unitary matrix of the singular value decomposition and the signal strength component comprises diagonal matrix of the singular value decomposition.

The singular value decomposition may be computed according to the following equation $$U \Lambda V^H = \frac{1}{\sigma^2} H^H H$$

where U and V comprise left and right unitary matrices of the singular value decomposition, $\Lambda$ comprises singular values of the singular value decomposition, H is the channel information, $\sigma^2$ is a noise variance of the UE, and the superscript H is the Hermitian transpose.

The noise variance of the UE may be estimated according to channel information. In particular, the noise variance $\sigma^2$ may be estimated according to the following equation $$\sigma^2 = \frac{P}{\sum_{l=1}^{L} SINR_l / L}$$

where L is the number of codewords used for the UE, P is the transmit power, and $SINR_l$ is the signal-to-interference-plus-noise ratio for the UE.

The method may further comprise determining a power allocation matrix according to the signal strength component, wherein the precoder is further generated according to the power allocation matrix. In particular, the power allocation matrix may be determined according to the signal strength component and a Lagrange multiplier.

The power allocation matrix D may be determined according to the following equation $$D_{n,n} = \sqrt{\left(\frac{1}{\sqrt{\upsilon \Lambda_{n,n}}} - \frac{1}{\Lambda_{n,n}}\right)^+}$$

$$D_{n,m} = 0, m \neq n$$

where $\Lambda$ comprises singular values of the singular value decomposition, $\upsilon$ is the Lagrange multiplier and the sign $(\ )^+$ means that if $(\ ) < 0$ then assign $(\ ) = 0$.

The precoder F may be generated according to the following equation $$F = WD$$

$$W = \begin{bmatrix} V_{1,1} & \cdots & V_{1,RI} \\ \vdots & \ddots & \vdots \\ V_{N_{TX},1} & \cdots & V_{N_{TX},RI} \end{bmatrix}$$

where $N_{TX}$ is the number of transmit antennas of the MIMO system and RI is the Rank of the MIMO system.

The Lagrange multiplier $\upsilon$ may be determined by:

a) Setting $\upsilon=(\upsilon_{max}+\upsilon_{min})/2$;
b) Computing the following quantity $$\hat{P} = \sum_{n=1}^{RI} \frac{1}{\Lambda_{n,n}} \left( \sqrt{\frac{\Lambda_{n,n}}{\upsilon}} - 1 \right)^+;$$

c) If $\hat{P}>P$ setting $\upsilon_{min}=\upsilon$ otherwise setting $\upsilon_{max}=\upsilon$;
d) repeating steps a)-c) until $|\hat{P}-P|<\varepsilon$, where $\varepsilon$ is a threshold for convergence, $\upsilon_{max}$ and $\upsilon_{min}$ are initially set to maximum and minimum values of the Lagrange multiplier, RI is the Rank of the MIMO system, P is the transmit power and the sign $(\ )^+$ means that if $(\ )<0$ then assign $(\ )=0$.

The MIMO system may be a TDD system, and a channel matrix may be estimated from the reciprocal channel.

The MIMO system may be an FDD system, and a representative channel may be derived from a precoder matrix indicator (PMI) of the channel information.

In another form, the invention resides broadly in a MIMO system including:

a plurality of antennas for providing data to a UE;

a processor coupled to the antennas; and a memory coupled to the processor, the memory including instruction code executable by the processor for:

receiving, from the UE, channel information relating to a channel on which the data is transmitted;

decomposing the channel information into components representing a transmission component and a signal strength component;

generating a precoder according to the transmission component and the signal strength component; and providing data to the UE on the plurality of antennas, wherein the data is encoded using the precoder.

The MIMO system may be an FDD system. Alternatively, the MIMO system may be a TDD system.

The channel information may be decomposed using singular value decomposition (SVD) according to the following equation $$U\Lambda V^H = \frac{1}{\sigma^2} H^H H$$

where U and V comprise left and right unitary matrices of the singular value decomposition, $\Lambda$ comprises singular values of the singular value decomposition, H is the channel information, $\sigma^2$ is a noise variance of the UE, and the superscript H is the Hermitian transpose.

The noise variance $\sigma^2$ may be estimated according to the following equation $$\sigma^2 = \frac{P}{\sum_{l=1}^{L} SINR_l/L}$$

where L is the number of codewords used for the UE, P is the transmit power, and $SINR_l$ is the signal-to-interference-plus-noise ratio for the UE.

The precoder may be further generated according to the power allocation matrix, and wherein the power allocation matrix D is determined according to the following equation $$D_{n,n} = \sqrt{\left( \frac{1}{\sqrt{\upsilon \Lambda_{n,n}}} - \frac{1}{\Lambda_{n,n}} \right)^+}$$

$$D_{n,m} = 0, m \neq n$$

where $\Lambda$ comprises singular values of the singular value decomposition, $\upsilon$ is a Lagrange multiplier and the sign $(\ )^+$ means that if $(\ )<0$ then assign $(\ )=0$.

The Lagrange multiplier $\upsilon$ is determined by:

a) Setting $\upsilon=(\upsilon_{max}+\upsilon_{min})/2$;
b) Computing the following quantity $$\hat{P} = \sum_{n=1}^{RI} \frac{1}{\Lambda_{n,n}} \left( \sqrt{\frac{\Lambda_{n,n}}{\upsilon}} - 1 \right)^+;$$

c) If $\hat{P}>P$ setting $\upsilon_{min}=\upsilon$ otherwise setting $\upsilon_{max}=\upsilon$;
d) repeating steps a)-c) until $|\hat{P}-P|<\varepsilon$, where $\varepsilon$ is a threshold for convergence, $\upsilon_{max}$ and $\upsilon_{min}$ are initially set to maximum and minimum values of the Lagrange multiplier, RI is the Rank of the MIMO system, P is the transmit power and the sign $(\ )^+$ means that if $(\ )<0$ then assign $(\ )=0$.

The precoder F may be generated according to the following equation $$F = WD$$

$$W = \begin{bmatrix} V_{1,1} & \cdots & V_{1,RI} \\ \vdots & \ddots & \vdots \\ V_{N_{TX},1} & \cdots & V_{N_{TX},RI} \end{bmatrix}$$

where $N_{TX}$ is the number of the plurality of antennas and RI is the Rank of the MIMO system.

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

BRIEF DESCRIPTION OF DRAWINGS

Various embodiments of the invention will be described with reference to the following drawings.

Preferred features, embodiments and variations of the invention may be discerned from the following Description of Embodiments which provides sufficient information for those skilled in the art to perform the invention. The Description of Embodiments is not to be regarded as limiting the scope of the preceding Summary of the Invention in any way.

DESCRIPTION OF EMBODIMENTS

Figure 1:
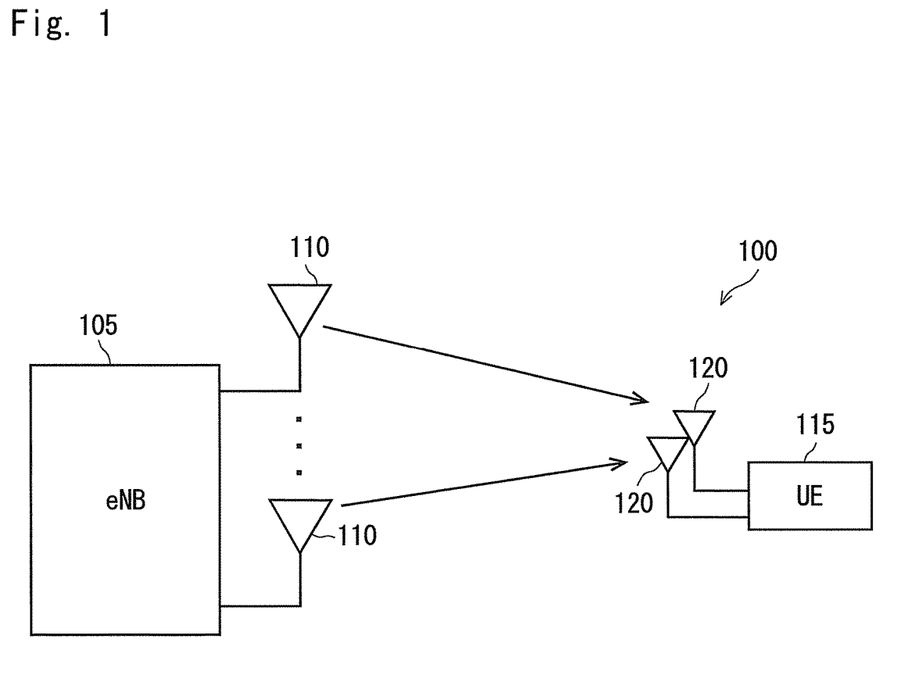
FIG. 1 illustrates a MIMO system according to an embodiment of the present invention.

FIG. 1 illustrates a MIMO system 100 according to an embodiment of the present invention. The MIMO system 100 includes an eNodeB 105 including a plurality of antennas 110, and a UE 115 including a plurality of antennas 120. The eNodeB 105 transmits data to the UE 115 on the same time-frequency from the plurality of antennas 120.

The use of multiple transmit antennas 110 and receive antennas 120 in the MIMO communication system 100 enables the eNodeB 105 to encode and transmit data on a number of spatial channels independently, possibly with different rates. Each antenna pair 110, 120 creates a different radio-antenna chain through which data may be transmitted.

The UE 115 computes noise power estimates, signal power estimates and channel estimates between the eNodeB 105 and that UE 115. The computed estimates are used to minimise interference between transmission layers by precoding. Precoding is used to support multi-layer transmission in multi-antenna wireless communications. Mathematically, a single user (SU)-MIMO system is described as follows.

$$y = HVx + n \quad \text{(Equation 1)}$$

In Equation 1:
y is a received signal of size $N_{RX} \times 1$,
x is a data signal of size $RI \times 1$,
H of size $N_{RX} \times N_{TX}$ is an estimated channel matrix in TDD or representative channel derived from PMI in FDD,
F is a precoder matrix $N_{TX} \times r_F$ (in most cases $r_F = RI$), and
n is an additive white Gaussian noise of size $N_{RX} \times 1$.

Figure 2:
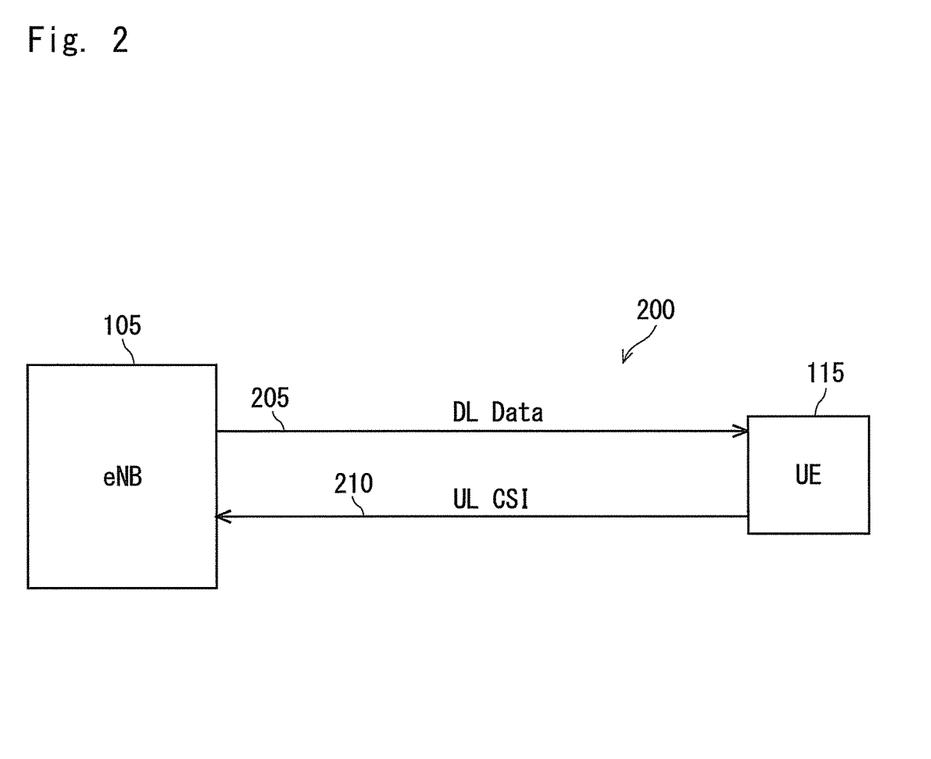
FIG. 2 illustrates a method of downlink data transmission and CSI feedback of the MIMO system of FIG. 1.

FIG. 2 illustrates a method 200 of downlink data transmission and CSI feedback of the MIMO system 100 of FIG. 1. The eNodeB 105 transmits downlink (DL) data to the UE 115 on its antennas 110 and the UE receives the DL data on multiple receive-antennas 120 at step 205. For minimizing inter-layer interferences, the UE 115 provides channel status information (CSI), which includes a precoder matrix indicator (PMI), to the eNodeB 105 at step 210.

The feedback of the CSI from the UE 115 to the eNodeB 105 enables the eNodeB 105 to modify subsequent DL signals to account for changing conditions and to maximise data throughput, as discussed in further detail below. In particular, the channel information may be decomposed into components representing a transmission component and a signal strength component from which the precoder is generated.

Figure 3:
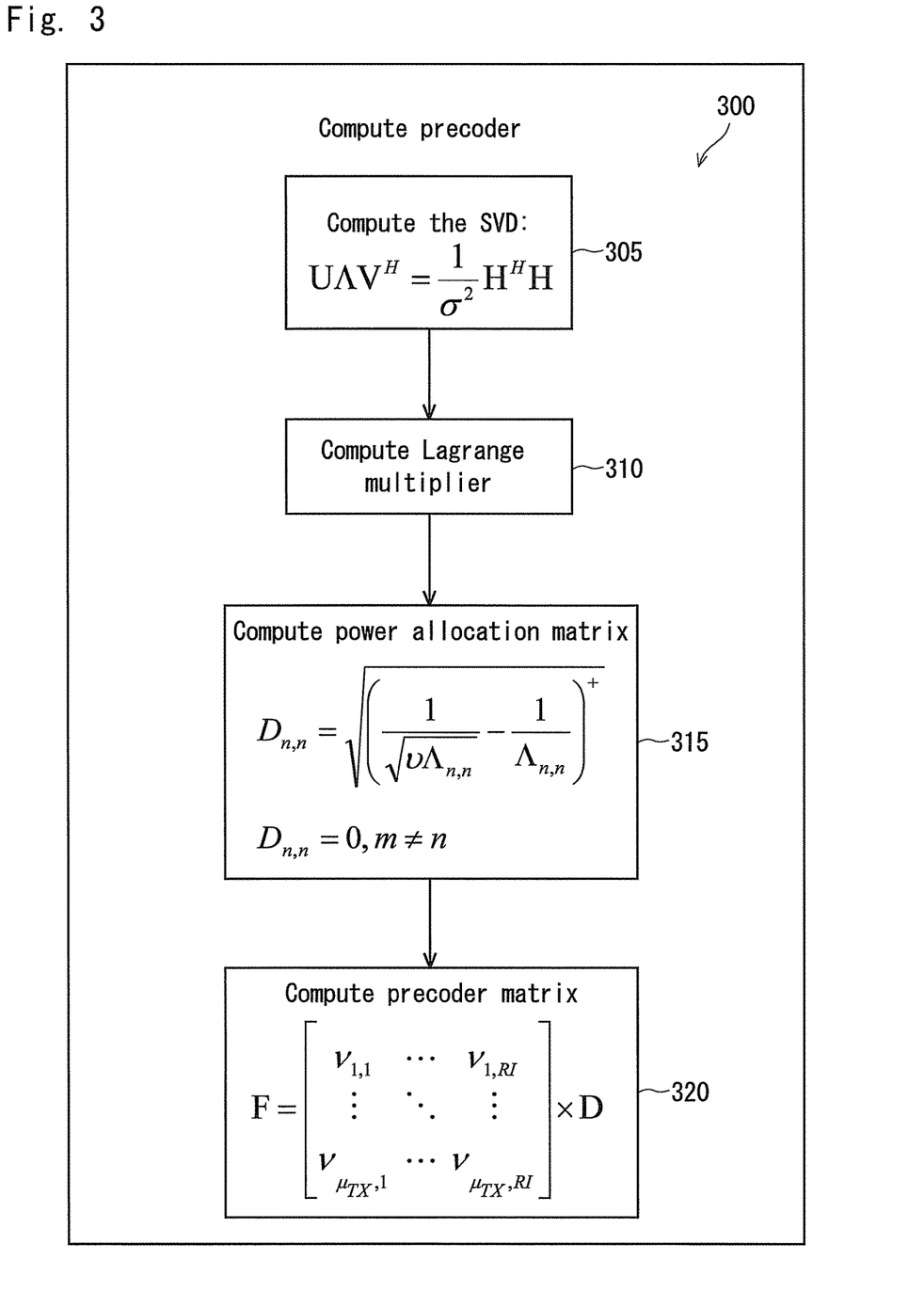
FIG. 3 illustrates a method of generating a precoder for use in a MIMO system when communication with a UE, according to an embodiment of the present invention.

FIG. 3 illustrates a method 300 of generating a precoder for use in a MIMO system when communication with a UE, according to an embodiment of the present invention. The method 300 can be used to generate a minimum-mean-squared-error optimised precoding in TDD transmission and to improve performance as compared to method which directly uses reported PMI in FDD transmission.

At block 305, singular values of the following decomposition are determined according to the following equation 2.

$$U \Lambda V^H = \frac{1}{\sigma^2} H^H H \quad \text{(Equation 2)}$$

In the above equation 2, U and V comprise left and right unitary matrices of the singular value decomposition, $\Lambda$ comprises singular values of the singular value decomposition, H is a channel matrix of the user, $\sigma^2$ is a noise variance of the UE, and the superscript H is the Hermitian transpose.

At block 310, a Lagrange multiplier $\upsilon$ is determined, for example as discussed in further detail below with reference to FIG. 4.

At block 315, a power allocation matrix D is determined according to the following equation 3.

$$D_{n,n} = \sqrt{\left(\frac{1}{\sqrt{\upsilon \Lambda_{n,n}}} - \frac{1}{\Lambda_{n,n}}\right)^+} \quad \text{(Equation 3)}$$

$$D_{n,m} = 0, m \neq n$$

At block 320, the precoder matrix F is generated according to the following equation 4.

$$F = WD \quad \text{(Equation 4)}$$

$$W = \begin{bmatrix} V_{1,1} & \cdots & V_{1,RI} \\ \vdots & \ddots & \vdots \\ V_{N_{TX},1} & \cdots & V_{N_{TX},RI} \end{bmatrix}$$

In the above equation, $N_{TX}$ is the number of transmit antennas of the MIMO system and RI is the Rank of the MIMO system.

Figure 4:
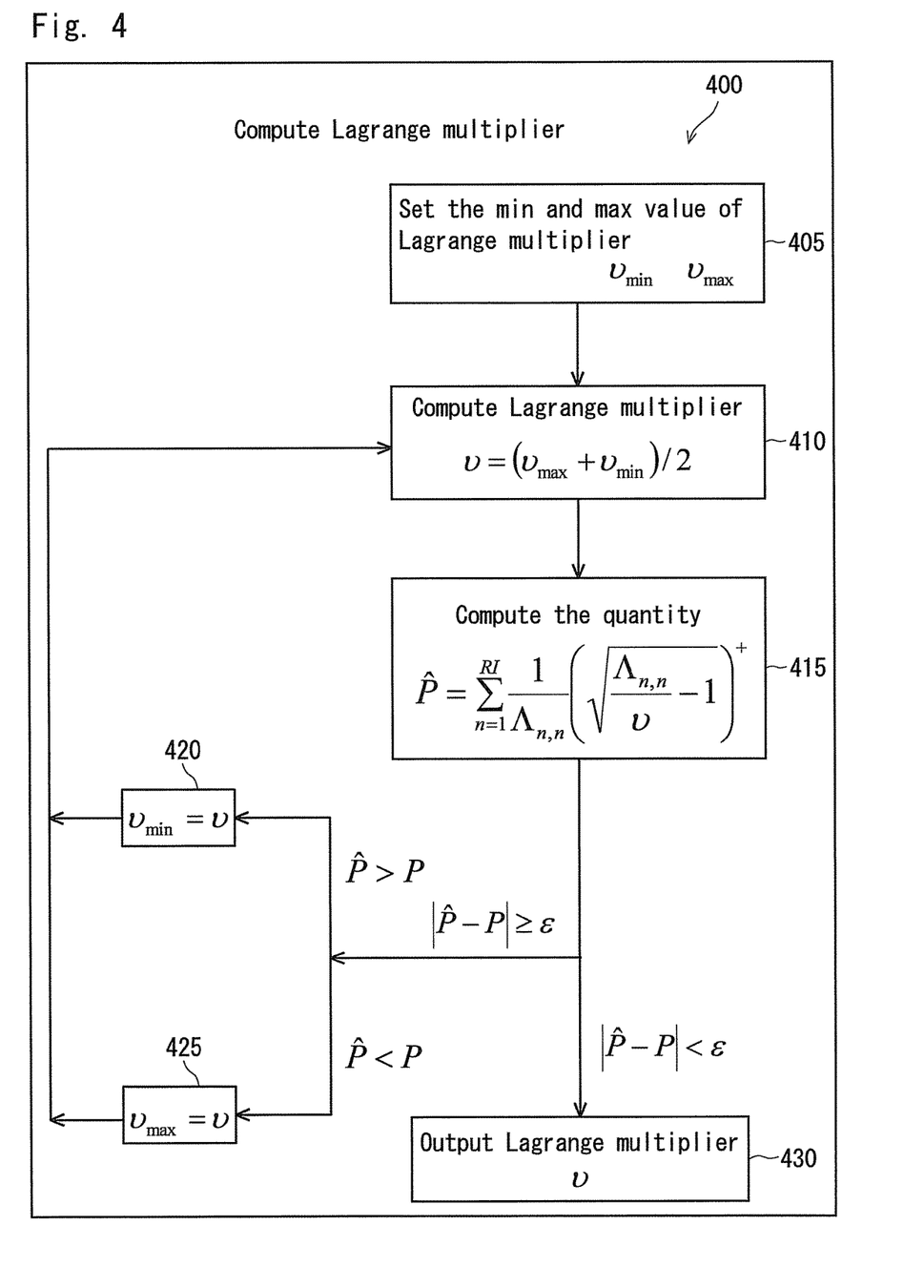
FIG. 4 illustrates a method of computing a Lagrange multiplier, according to an embodiment of the present invention.

FIG. 4 illustrates a method of computing a Lagrange multiplier, according to an embodiment of the present invention.

At block 405, minimum and maximum values of the Lagrange multiplier $\upsilon_{min}$ and $\upsilon_{max}$ are set.

At block 410, the Lagrange multiplier $\upsilon$ is set as $\upsilon = (\upsilon_{max} + \upsilon_{min})/2$.

At block 415, the following quantity is computed according to equation 5:

$$\hat{P} = \sum_{n=1}^{RI} \frac{1}{\Lambda_{n,n}} \left(\sqrt{\frac{\Lambda_{n,n}}{\upsilon}} - 1\right)^+ \quad \text{(Equation 5)}$$

where the sign ( )+ means that if ( )<0 then assign ( )=0.

If $\hat{P} > P$ then the minimum value of the Lagrange multiplier is set in 420 as $\upsilon_{min} = \upsilon$, otherwise the maximum value of the Lagrange multiplier is set in 425 as $\upsilon_{max} = \upsilon$.

Blocks 410-415 are repeated until $|\hat{P} - P| < \varepsilon$, upon which the Lagrange multiplier $\upsilon$ is output in block 430, where $\varepsilon$ is a threshold for convergence.

According to certain embodiments, the noise variance $\sigma^2$ is estimated from the reported CQI (Channel Quality Indicator) as follows:

a) Find $SINR_l$ based on the SINR thresholds in the CQI table.

Calculate $\sigma^2$ using $SINR_l$, number of codewords L and transmit power P as the following equation.

$$\sigma^2 = \frac{P}{\sum_{l=1}^{L} SINR_l/L}$$

In the above equation, L is the number of codewords used for the UE, P is the transmit power, and $SINR_l$ is the signal-to-interference-plus-noise ratio for the UE.

While only two antennas are depicted above, the skilled addressee will readily appreciate that any number of suitable antennas can be used on the eNodeB and/or UE.

According to certain embodiments, the MIMO system is a TDD system, and a channel matrix is estimated from the reciprocal channel. Alternatively, the MIMO system is an FDD system, and a representative channel is derived from a precoder matrix indicator (PMI) of the channel information.

In the present specification and claims (if any), the word "comprising" and its derivatives including "comprises" and "comprise" include each of the stated integers but does not exclude the inclusion of one or more further integers.

Reference throughout this specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

This application is based upon and claims the benefit of priority from Australian provisional patent application No. 2014905071, filed on Dec. 15, 2014, the disclosure of which is incorporated herein in its entirety by reference.

REFERENCE SIGNS LIST

100 MIMO SYSTEM
105 eNB
110, 120 ANTENNA
115 UE

What is claimed is:

1. A method of generating a precoder for use in a MIMO (Multiple-Input Multiple-Output) system when communicating with a UE (User Equipment), the method comprising:
  receiving, from the UE, channel information relating to a channel on which data is transmitted;
  decomposing the channel information into components representing a transmission component and a signal strength component; and
  generating the precoder according to the transmission component and the signal strength component,
  wherein the channel information is decomposed using a singular value decomposition (SVD),
  wherein the singular value decomposition is computed according to the following equation $$U \Lambda V^H = \frac{1}{\sigma^2} H^H H$$

where U and V comprise left and right unitary matrices of the singular value decomposition, $\Lambda$ comprises singular values of the singular value decomposition, H is the channel information, $\sigma^2$ is a noise variance of the UE, and the superscript H is the Hermitian transpose, and
  wherein the noise variance $\sigma^2$ is estimated according to the following equation $$\sigma^2 = \frac{P}{\sum_{l=1}^{L} SINR_l/L}$$

where L is a number of codewords used for the UE, P is a transmit power, and $SINR_l$ is a signal-to-interference-plus-noise ratio for the UE.

2. The method of claim 1, wherein the transmission component comprises a unitary matrix of the singular value decomposition and the signal strength component comprises diagonal matrix of the singular value decomposition.

3. The method of claim 1, wherein the noise variance of the UE is estimated according to channel information.

4. The method of claim 1, wherein the MIMO system is a TDD (Time-Division Duplexing) system, and a channel matrix is estimated from the reciprocal channel.

5. The method of claim 1, wherein the MIMO system is an FDD (Frequency-Division Duplexing) system, and a representative channel is derived from a precoder matrix indicator (PMI) of the channel information.

6. A method of generating a precoder for use in a MIMO (Multiple-Input Multiple-Output) system when communicating with a UE (User Equipment), the method comprising:
  receiving, from the UE, channel information relating to a channel on which data is transmitted;
  decomposing the channel information into components representing a transmission component and a signal strength component;
  generating the precoder according to the transmission component and the signal strength component;
  determining a power allocation matrix according to the signal strength component, wherein the precoder is further generated according to the power allocation matrix,
  wherein the power allocation matrix is determined according to the signal strength component and a Lagrange multiplier, and
  wherein the power allocation matrix D is determined according to the following equation $$D_{n,n} = \sqrt{\left(\frac{1}{\sqrt{\nu \Lambda_{n,n}}} - \frac{1}{\Lambda_{n,n}}\right)^+}$$

$$D_{n,m} = 0, \, m \neq n$$

where Λ comprises singular values of the singular value decomposition, $\upsilon$ is the Lagrange multiplier and the sign $(\ )^+$ means that if $(\ )<0$ then assign $(\ )=0$.

7. The method of claim 6, wherein the precoder F is generated according to the following equation $$F = WD$$

$$W = \begin{bmatrix} v_{1,1} & \cdots & v_{1,RI} \\ \vdots & \ddots & \vdots \\ v_{N_{TX},1} & \cdots & v_{N_{TX},RI} \end{bmatrix}$$

where $N_{TX}$ is the number of transmit antennas of the MIMO system and RI is the Rank of the MIMO system.

8. The method of claim 6, wherein the Lagrange multiplier $\upsilon$ is determined by:
a) Setting $\upsilon = (\upsilon_{max} + \upsilon_{min})/2$;

$$\hat{P} = \sum_{n=1}^{RI} \frac{1}{\Lambda_{n,n}} \left( \sqrt{\frac{\Lambda_{n,n}}{\upsilon}} - 1 \right)^+;$$

b) Computing the following quantity
c) If $\hat{P} > P$ setting $\upsilon_{min} = \upsilon$ otherwise setting $\upsilon_{max} = \upsilon$;
d) repeating steps a)-c) until $|\hat{P} - P| < \varepsilon$,
where $\varepsilon$ is a threshold for convergence, $\upsilon_{max}$ and $\upsilon_{min}$ are initially set to maximum and minimum values of the Lagrange multiplier, RI is the Rank of the MIMO system, P is the transmit power and the sign $(\ )^+$ means that if $(\ )<0$ then assign $(\ )=0$.

9. A MIMO system including:
a plurality of antennas for providing data to a UE;
a processor coupled to the antennas; and
a memory coupled to the processor, the memory including instruction code executable by the processor for:
receiving, from the UE, channel information relating to a channel on which the data is transmitted;
decomposing the channel information into components representing a transmission component and a signal strength component;
generating a precoder according to the transmission component and the signal strength component; and
providing data to the UE on the plurality of antennas, wherein the data is encoded using the precoder,
wherein the channel information is decomposed using a singular value decomposition (SVD) according to the following equation $$U \Lambda V^H = \frac{1}{\sigma^2} H^H H$$

where U and V comprise left and right unitary matrices of the singular value decomposition, Λ comprises singular values of the singular value decomposition, H is the channel information, $\sigma^2$ is a noise variance of the UE, and the superscript H is the Hermitian transpose, and wherein the noise variance $\sigma^2$ is estimated according to the following equation $$\sigma^2 = \frac{P}{\sum_{l=1}^{L} SINR_l / L}$$

where L is a number of codewords used for the UE, P is a transmit power, and $SINR_l$ is a signal-to-interference-plus-noise ratio for the UE.

10. The system of claim 9, wherein the MIMO system is an FDD system.

11. The system of claim 9, wherein the MIMO system is a TDD system.

12. The system of claim 9, wherein the precoder is further generated according to the power allocation matrix, and wherein the power allocation matrix D is determined according to the following equation $$D_{n,n} = \sqrt{\left( \frac{1}{\sqrt{\upsilon \Lambda_{n,n}}} - \frac{1}{\Lambda_{n,n}} \right)^+}$$

$$D_{n,m} = 0, m \neq n$$

where Λ comprises singular values of the singular value decomposition and $\upsilon$ is a Lagrange multiplier and the sign$(\ )^+$ means that if $(\ )<0$ then assign$(\ )+0$.

13. The system of claim 12 wherein the Lagrange multiplier $\upsilon$ is determined by:
a) Setting $\upsilon = (\upsilon_{max} + \upsilon_{min})/2$;

$$\hat{P} = \sum_{n=1}^{RI} \frac{1}{\Lambda_{n,n}} \left( \sqrt{\frac{\Lambda_{n,n}}{\upsilon}} - 1 \right)^+;$$

b) Computing the following quantity
c) If $\hat{P} > P$ setting $\upsilon_{min} = \upsilon$ otherwise setting $\upsilon_{max} = \upsilon$;
d) repeating steps a)-c) until $|\hat{P} - P| < \varepsilon$,
where $\varepsilon$ is a threshold for convergence, $\upsilon_{max}$ and $\upsilon_{min}$ are initially set to maximum and minimum values of the Lagrange multiplier, RI is the Rank of the MIMO system, P is the transmit power and the sign $(\ )^+$ means that if $(\ )<0$ then assign $(\ )+0$.

* * * * *